United States Patent [19]

Mita et al.

[11] Patent Number: 5,001,768

[45] Date of Patent: Mar. 19, 1991

[54] IMAGE READING APPARATUS

[75] Inventors: Yoshinobu Mita, Kawasaki; Naoto Kawamura, Yokohama; Tadashi Yoshida, Ichikawa; Katsuhito Dei, Tokyo, all of Japan

[73] Assignee: Canon Kabushiki Kaisha, Tokyo, Japan

[21] Appl. No.: 559,978

[22] Filed: Jul. 30, 1990

Related U.S. Application Data

[63] Continuation of Ser. No. 403,050, Sep. 1, 1989, abandoned, which is a continuation of Ser. No. 314,276, Feb. 23, 1989, abandoned, which is a continuation of Ser. No. 150,495, Feb. 1, 1988, abandoned, which is a continuation of Ser. No. 758,543, Jul. 24, 1985, abandoned.

[30] Foreign Application Priority Data

Jul. 31, 1984 [JP] Japan ................................ 160332
Jul. 31, 1984 [JP] Japan ................................ 160333

[51] Int. Cl.$^5$ .......................................... G06K 9/00
[52] U.S. Cl. ................................... 382/50; 382/54; 358/163; 358/455; 358/461; 356/404; 364/722
[58] Field of Search ................. 382/80, 54, 52, 31; 358/107, 163, 461, 455; 356/404; 364/722

[56] References Cited

U.S. PATENT DOCUMENTS

| | | | |
|---|---|---|---|
| 3,800,079 | 3/1974 | McNeil et al. | 178/7.1 |
| 3,919,471 | 11/1975 | Spiessbach et al. | 358/163 |
| 3,988,602 | 10/1976 | Gorsica, Jr. | 382/54 |
| 4,089,060 | 5/1978 | Mitchell | 364/722 |
| 4,301,472 | 11/1981 | Danos | 358/163 |
| 4,325,086 | 4/1982 | Sato et al. | 358/296 |
| 4,385,318 | 5/1983 | Miller | 358/282 |
| 4,472,736 | 9/1918 | 4Ushio | 382/18 |
| 4,523,229 | 6/1985 | Kanmoto | 358/163 |
| 4,524,388 | 6/1985 | Abe et al. | 358/163 |
| 4,549,220 | 10/1985 | Suzuki | 358/282 |

*Primary Examiner*—David K. Moore
*Assistant Examiner*—Yon Jung
*Attorney, Agent, or Firm*—Fitzpatrick, Cella, Harper & Scinto

[57] ABSTRACT

An image reading apparatus has a CCD sensor, a white standard plate of a uniform density, a shading data memory, an analog/log converter or a digital/log converter, and a shading correction circuit. Shading correction can be performed with a simple circuit and requiring only a small-capacity memory.

7 Claims, 10 Drawing Sheets

IMAGE READING APPARATUS

This application is a continuation of application U.S. Ser. No. 07/403,050 filed 09/01/89 which is a continuation of U.S. Ser. No. 07/314,276, filed 02/23/89, which is a continuation of U.S. Ser. No. 150,495, filed 02/01/88, which is a continuation of U.S. Ser. No. 758,543, filed 07/24/85, all now abandoned.

BACKGROUND OF THE INVENTION

1. Field of the Invention

The present invention relates to an image reading apparatus for converting an original image into electrical image data and supplying the image data to a processing apparatus for electrically processing image information, such as a facsimile system, a digital copying machine, or an electronic image file.

2. Description of the Prior Art

An image reading apparatus is known which photoelectrically reads an image on a book or a document or an image recorded on a film or the like, using an image sensor such as a CCD. In such image reading, the density of a read image may vary due to variations in a light source for illuminating a reading object or in other optical members such as a lens and a mirror for guiding light reflected from or transmitted through an object being read to an image sensor, or due to nonuniform sensitivity of a plurality of light-receiving elements of the image sensor.

In view of this, in order to perform image reading with a high reliability, a correction operation called shading correction is performed.

When shading correction is performed, digital image data obtained by A/D conversion of an output analog image signal from a solid-state image sensor is multiplied with or divided by shading correction data.

However, in such a conventional shading correction scheme, the configuration of an operation/processing circuit for performing such multiplication/division becomes complex. In addition, an expensive multiplier or a ROM of a large capacity for storing shading correction data must be used.

In this scheme, a white standard plate of a predetermined density is used. Shading correction data is obtained by reading the white standard plate for all pixels or for every predetermined number of pixels along the main scanning direction by a sensor. Image data of a reading object is read by the same sensor and is corrected by the shading correction data. In this case, if the white standard plate is contaminated, scratched or the like, shading correction data corresponding to such a portion contains an error. Then, the image data which is shading corrected using this shading correction data results in a corresponding spot or stripe in a reproduced image, thus yielding a poor image.

SUMMARY OF THE INVENTION

The present invention has been made in consideration of this and has as its object to provide an image reading apparatus for removing shading of image data obtained by reading an original image and for obtaining high-quality image data.

It is another object of the present invention to provide an image reading apparatus capable of high-speed shading correction with a simple circuit configuration.

It is still another object of the present invention to prevent introduction of noise in shading correction data so as to allow reliable shading correction.

The above and other objects, features and advantages of the present invention will become apparent from the following description when taken in conjunction with the accompanying drawings.

DETAILED DESCRIPTION OF THE PREFERRED EMBODIMENTS

The preferred embodiment of the present invention will be described below.

Figure 1:
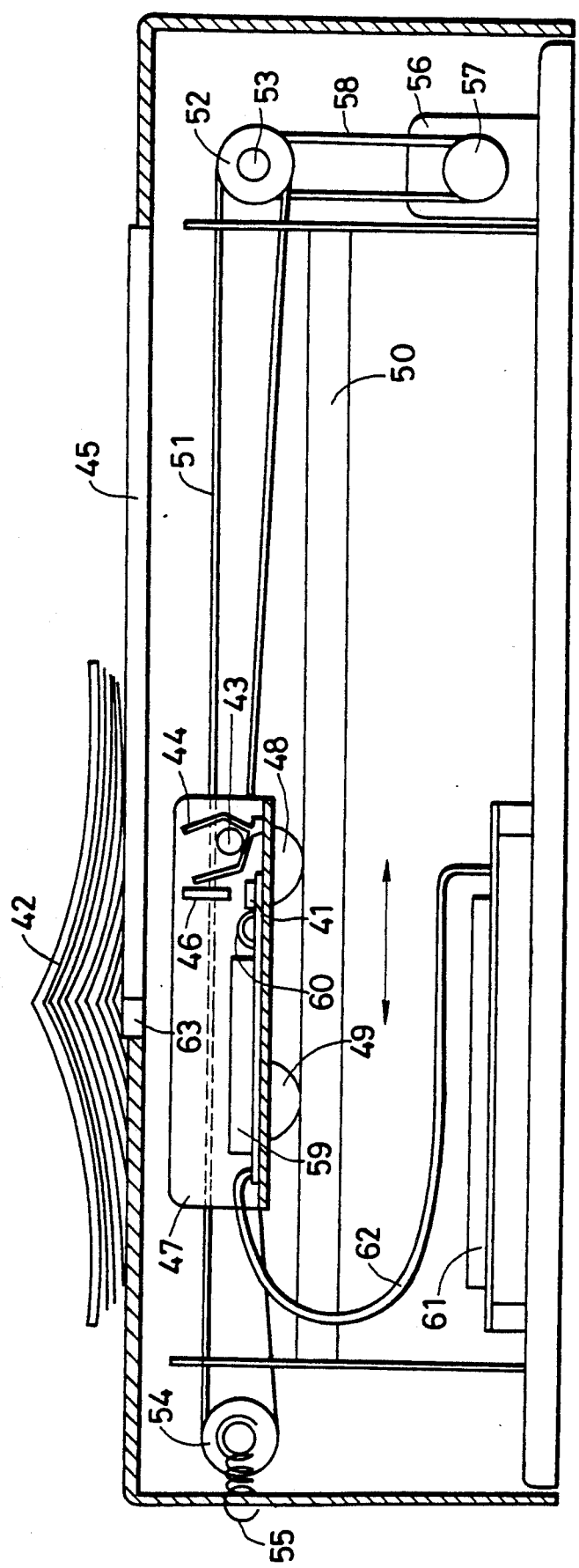
FIG. 1 is a sectional view showing a construction of an original reading apparatus according to an embodiment of the present invention.

FIG. 1 is a sectional view showing the construction of an original reading apparatus according to an embodiment of the present invention. A read sensor 41 comprises an array of a plurality of light-receiving elements of amorphous silicon. The sensor 41 comprises, for example, 5,000 light-receiving elements which are linearly arranged to cover the reading width of an original. An original 42 placed on an original glass table 45 is illuminated by an illumination lamp 43 as a light source. A rod lens array 46 projects onto the read sensor 41 reflected light from the original 42 on the table 45. Wheels 48 and 49 are mounted on the lower portion of a carriage 47 and slide on the surfaces of two rails 50. The two ends of a wire 51 for driving the carriage 47 are fixed to the carriage 47. A pulley 52 for driving the wire 51 is fixed to a shaft 53. A drag pulley 54 is pulled by a spring 55 in a direction to pull the wire. The apparatus also includes a motor 56, a motor pulley 57, and a belt 58 for transmitting rotational motion of the motor pulley 57 to the pulley 52.

A preprocessing circuit 59 performs preprocessing of a read signal. A signal line 60 is for supplying a signal from the read sensor 41 to the preprocessing circuit 59. A postprocessing circuit 61 performs storage, operation and output of the signal. A signal line 62 supplies a signal from the preprocessing circuit 59 to the postprocessing circuit 61.

A white standard plate 63 is painted at a uniform density in a standard color (white in this case). The standard plate 63 is read by the read sensor 41 so as to detect the reading characteristics of the sensor 41.

Rotational motion of the motor 56 is converted into linear motion of the carriage 47 through the motor pulley 57, the belt 58, the pulley 52, and the wire 51. When the motor 56 is rotated in forward and reverse directions, the carriage 47 is slid (reciprocated) in directions indicated by arrows on the surface of the rails 50 through the wheels 48 and 49. At this time, since the illumination lamp 43, the reflection mirror 44, the rod lens array 46, the read sensor 41, the signal line 60, and the preprocessing circuit 59 are mounted on the carrier, they undergo the same motion as the carriage 47.

The original 42 is scanned by the illumination lamp 43. Light reflected from the original 42 forms an image on the read sensor 41 through the rod lens array 46. The read sensor 41 produces an analog signal corresponding to the image formed thereon. The analog signal is supplied to the preprocessing circuit 59 through the signal line 60. After the signal is subjected to predetermined preprocessing by the preprocessing circuit 59, it is supplied to the postprocessing circuit 61 through the signal line 62. In this manner, as part of the original is scanned, the carriage 47 is moved (subscanned) in the direction indicated by the arrows, thereby scanning the entire area of the original.

Figure 2:
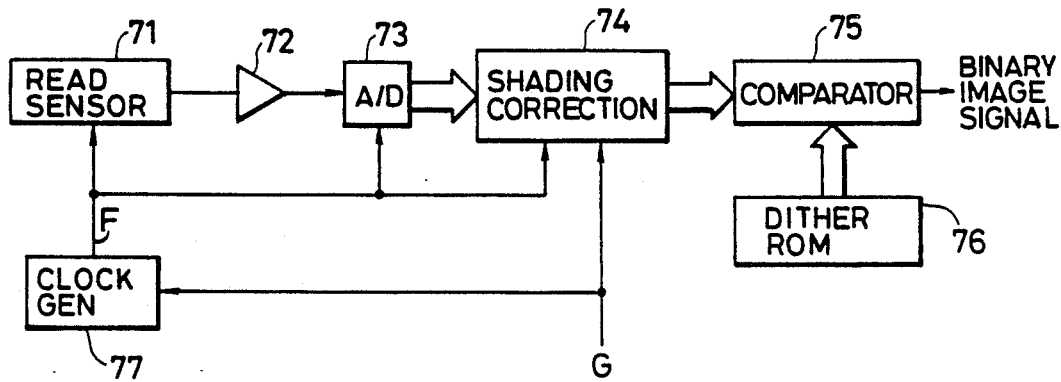
FIG. 2 is a block diagram of a processing circuit for processing read image signals.

FIG. 2 shows the configuration of a processing circuit for processing a read image signal in the original reading apparatus shown in FIG. 1. In FIG. 2, a read sensor 71 corresponds to the read sensor 41 in FIG. 1. A clock generator 77 supplies to the reading sensor 71 image transfer clocks F for allowing it to read an original image in response to a main scanning sync signal G synchronous with 1-line reading of the sensor 71.

In synchronism with the image transfer clock F, the read sensor 71 serially produces an analog image signal corresponding to each read pixel. The analog image signal from the read sensor 71 is amplified by an amplifier 72 having a predetermined gain, and is thereafter converted into a digital image signal representing a density of each pixel by an analog/digital (A/D) converter 73.

A shading correction device 74 is for correcting non-uniform outputs from the read sensor 71. More particularly, the device 74 corrects read data from the read sensor 71 in accordance with data obtained by reading the white standard plate 63 by the same read sensor 71.

A comparator 75 digitizes the shading corrected digital image signal into a binary signal by comparing the digital image signal with a threshold value. The comparator 75 receives as the threshold value a dither pattern signal for pseudo-halftone production from a dither ROM 76.

With this circuit configuration, the digital image signal corresponding to the image read by the read sensor 71 is obtained. The digital image signal thus obtained is supplied to a printer, an image file or the like or is transmitted to a receiving apparatus at a remote location by a transmission function.

Shading correction for variations in read signals due to optical variations in the light source, lenses and the like, and due to variations in the outputs from the read sensor in the circuit configuration shown in FIG. 2 will be described below.

Figure 3:
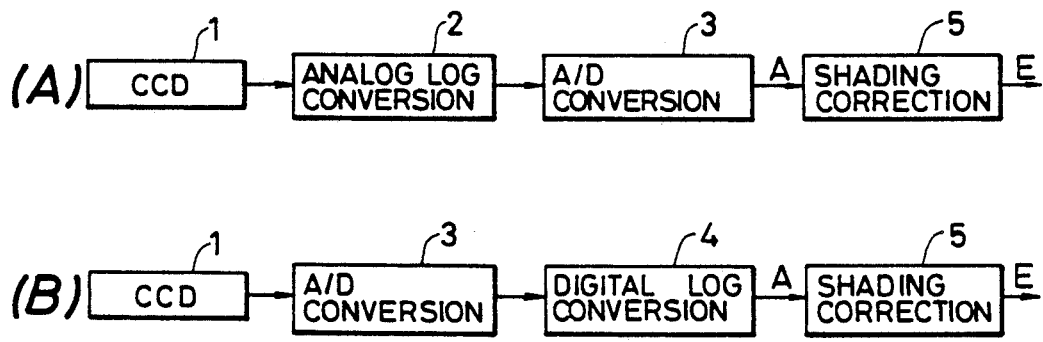
FIGS. 3A and 3B are block diagrams showing configurations of a shading correction device.

FIG. 3A shows a basic configuration of a device for performing shading correction. In the arrangement illustrated in FIG. 3A, an analog image signal as a read output from a read sensor or an image sensor 1 comprising a charge-coupled device (CCD) in the image sensing system of the copying machine is converted into a logarithmic value by an analog/log conversion circuit 2. The logarithmic value of the analog image signal is supplied to an analog/digital (A/D) converter 3 and is converted into a digital logarithmic value A.

Figure 5:
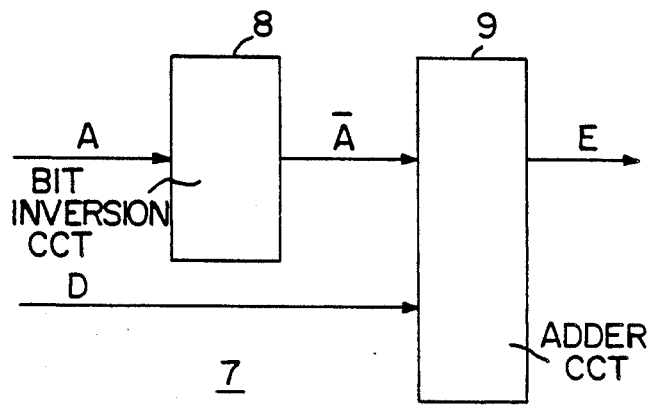
FIG. 5 is a block diagram of a subtraction circuit shown in FIG. 4.

The digital logarithmic value A is supplied to a shading correction circuit 5 of a configuration as illustrated in FIG. 5. A digital image signal E is obtained by shading correction in accordance with an operation principle to be described later.

The digital image signal E thus obtained can be output as the digital image signal in the case of FIG. 2. Alternatively, it is subjected to digital/analog conversion so as to provide a shading corrected analog image signal.

In the basic circuit configuration for performing shading correction shown in FIG. 3A, an analog image signal obtained by reading an original image is converted into a logarithmic value which is then converted into a digital image signal. However, in shading correction, if an image signal to be digitized is converted into a logarithmic value, the order of various signal conversion steps and the like before shading correction is not particularly limited.

FIG. 3B shows a circuit configuration wherein the order of signal conversion steps is different from that shown in FIG. 3A.

In the circuit configuration for shading correction shown in FIG. 3B, an analog image signal from an image sensor 1 is supplied to an A/D converter 3 to be converted into a digital image signal. The digital image signal is supplied to a digital/log conversion circuit 4. Thus, the digital logarithmic value A as in the case of FIG. 3A is obtained and is supplied to a shading correction circuit 5. In the case of FIG. 3B, as in the case of FIG. 3A, the digital image signal E subjected to shading correction can be obtained.

Figure 4:
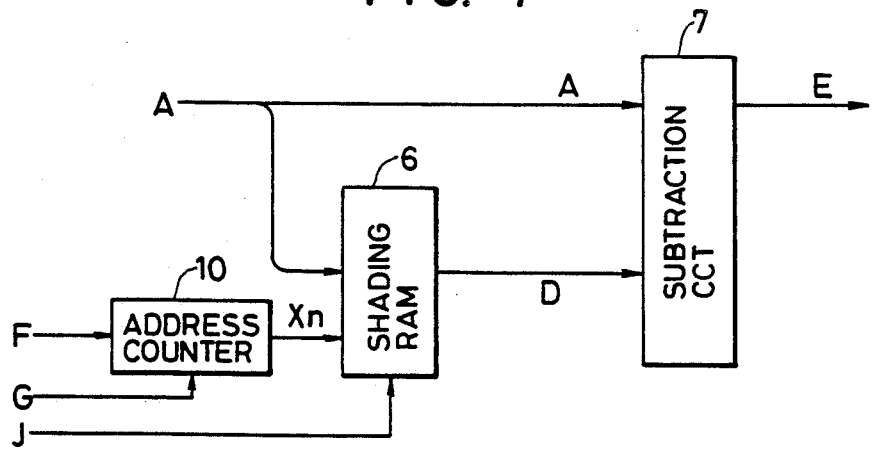
FIG. 4 is a block diagram of a shading correction circuit in FIGS. 3A and 3B.

FIG. 4 shows an example of the configuration of the shading correction circuit 5 shown in FIG. 3A or 3B. Prior to description of the shading correction circuit, the operation principle for shading correction according to the embodiment of the present invention will be described.

Figure 6A:
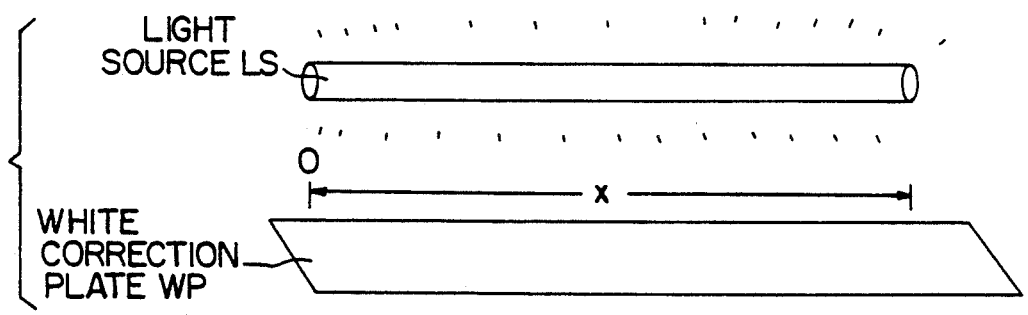
FIGS. 6A and 6B are a perspective view showing the arrangement of a shading correction white standard plate and a graph showing correction characteristics.
Figure 6B:
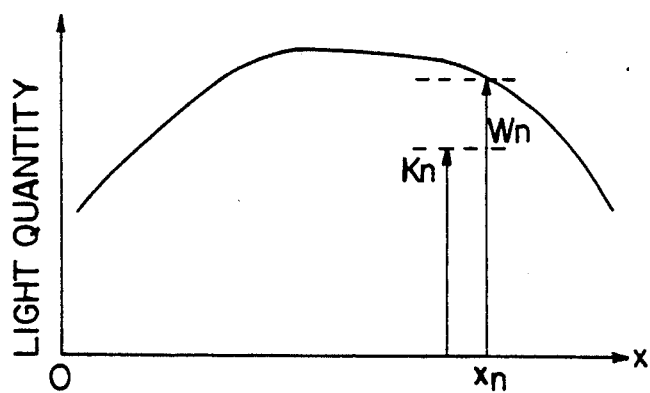
Figure 7:
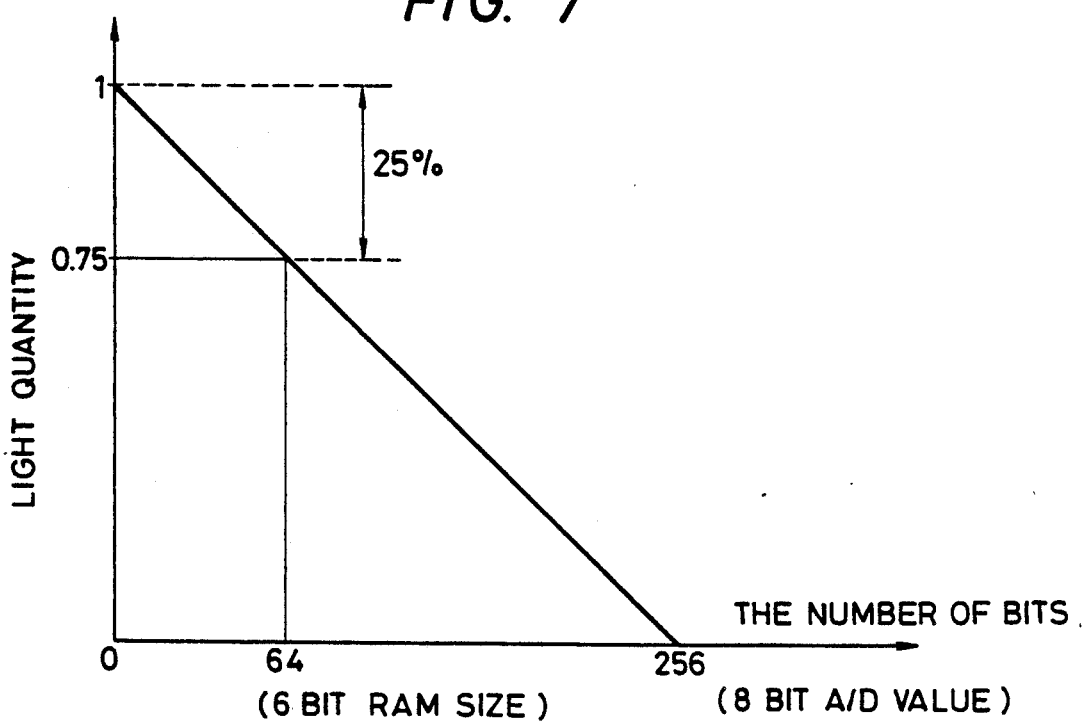
FIG. 7 is a graph showing the RAM size required for shading correction when logarithmic conversion is not performed.

Before reading an actual original image, as shown in FIG. 6A, a white standard plate WP of a chart having a uniform density so as to obtain shading correction values is illuminated with light from a rod-like light source LS along its longitudinal direction X. The image of the plate WP is read by a predetermined sensor system. The obtained image data is plotted on the X-Y coordinate system wherein displacement Xn along the X-direction is plotted along the X-axis, and shading correction data Wn is plotted along the Y-axis, as shown in FIG. 6B. Thereafter, image data Kn obtained by reading an actual reading object such as an original by the same image sensor system is plotted. Then, shading-corrected image data Rn can be expressed by:

$$Rn = A \times Kn \times (1/Wn)$$

where A is a constant.

In this manner, when the image data Kn and the shading correction data Wn are operated on in accordance with this equation, predetermined shading correction can be performed.

In general, when a density and a reflectivity of an original are represented by E and R, respectively, we have:

$$E = -\log R$$

Then, for the shading correction data Wn obtained at displacement Xn by reading the white standard plate WP (63) shown in FIG. 6A and for image data Kn obtained at displacement Xn by reading the reading object image, an image density En of shading corrected image has the following relation:

$$En = -\log(Kn/Wn)$$

This equation can be rewritten as:

$$En = -\log Kn + \log Wn$$

Therefore, when the logarithmic value of the image data Kn is obtained for the reading object image at the displacement Xn, the corresponding logarithmic value of the shading correction data Wn at the displacement Xn obtained in advance using the white standard plate WP and stored in a suitable memory or the like is read out therefrom. The logarithmic values corresponding to the white standard plate WP are subtracted from those corresponding to the actual read image. Then, the density En at the displacement Xn after shading correction can be obtained readily.

The shading correction circuit 5 shown in FIG. 4 has the configuration so as to perform shading correction in accordance with the operation principle described above.

First, a shading RAM(random-access memory) 6 is set in the write mode by a read/write control signal J. Logarithmic values D of shading correction data Wn obtained by reading the white standard plate WP with the circuit configuration shown in FIG. 3A or 3B are stored in the shading RAM 6 using the displacement Xn from an address counter 10 as addresses. The address counter 10 is cleared by a main scanning sync signal G, starts counting the image transfer clocks F, and produces the count as Xn. The digital logarithmic values A of image signals obtained by reading an original with the circuit configuration shown in FIG. 3A or 3B are supplied to a subtraction circuit 7. The shading RAM 6 is set in the read mode by a read/write control signal J and is accessed by the displacement Xn output from the address counter 10 as the addresses in synchronism with the input of the input digital logarithmic values A. Thus, the logarithmic values D of the shading correction data Wn at the displacement Xn prestored using the white standard plate WP are read out from the shading RAM 6. The logarithmic values D are supplied to the subtraction circuit 7 and are subtracted from the logarithmic values A of the actual image so as to obtain image density data En after shading correction.

An example of the subtraction circuit 7 is illustrated in FIG. 5. Referring to FIG. 5, the digital logarithmic value D is supplied as logWn to an adder circuit 9. The logarithmic value A is supplied to a bit inversion circuit 8 comprising a inverter or the like to be converted into an inverted signal A in the form of -logKn. The inverted signal is supplied to the adder circuit 9. Addition is performed by the following equation:

$$En = -\log Kn + \log Wn$$

so as to obtain the density data En after shading correction. The adder circuit 9 can be easily obtained by a TTL IC or the like.

When the A/D converter 3 has an 8-bit configuration and a shading correction circuit for correcting to a maximum of 25% shading caused by variations in the light source is to be implemented, if logarithmic conversion is not to be utilized, a 6-bit memory for storing shading correction data for 64 levels, i.e., 25% of 256 levels obtained by dividing the density range corresponding to a relative value 1 of the total amount of light into 256 levels is required.

In contrast to this, in the shading correction device according to the embodiment of the present invention, since shading correction data is stored in the form of logarithmic values, the light amount loss of 25% by shading is smaller than 25% of the total density range. Therefore, the memory capacity for storing the shading correction data can be reduced considerably.

Assume a case wherein, considering the state of an actual original image and an image density printable by a printer, a maximum density is set about 1.8, 1.8 is divided into 256 levels, and the image is reproduced with single density difference at each density level of $1.8/256 = 0.0703$. In this case, when the light amount becomes 0.75 of the original amount due to 25% shading, the density is $-\log 0.75 = 0.1249$. When this density is subjected to analog/digital conversion, we obtain $$0.1249 \div 0.0703 = 17.76$$

Figure 8:
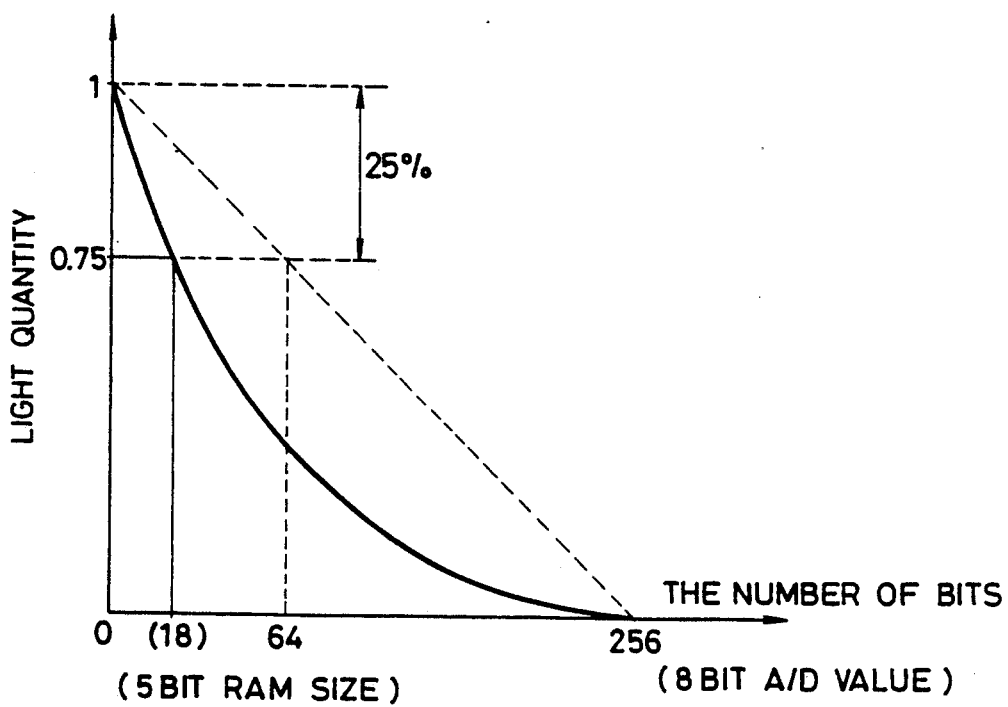
FIG. 8 is a graph showing the RAM size required for shading correction when logarithmic conversion is performed.

Thus, as shown in FIG. 8, the capacity of the shading RAM can be reduced. In addition, the shading correction data to be stored in the shading RAM 6 can have a 5-bit configuration.

As can be seen from the above description, an image signal obtained by an image sensor system of a copying machine can be subjected to correction of shading caused by variations in a light source or an optical system with only a simple and inexpensive circuit, irrespective of the particular arrangement of the image sensor system, and with excellent reliability and ease. In addition, a random access memory of only a small capacity is required, and the circuit scale of the shading correction device is reduced. The signal processing time per pixel can be reduced to about ½ of the operation processing time by a multiplier or an access time of the ROM in a conventional system. The apparatus of the present invention is suitable for performing shading correction by real time processing or pipeline processing and allows easy, high-speed processing in a copying machine or the like.

In the configuration shown in FIG. 3A or 3B, a separate analog/log conversion circuit or digital/log conversion circuit is used. However, the present invention is not limited to this. Thus, an analog/digital converter having a logarithmic conversion characteristic, i.e., an analog/digital converter with non-linear characteristic can be used. With this converter, analog/digital conversion and logarithmic conversion can be simultaneously performed.

In the above description, the image transfer clocks E are counted, and the shading correction data corresponding to all pixels of one scanning line is stored in the shading RAM 6 using the count of the clocks E as an address. Therefore, if the white standard plate WP as a standard for shading correction data is scratched or contaminated, the corresponding shading correction data becomes incorrect.

Then, shading correction corresponding to the read image data of an original image cannot be correct, and the image data is interfered with.

An arrangement for resolving these problems and for allowing reliable shading correction will be described.

Figure 9:
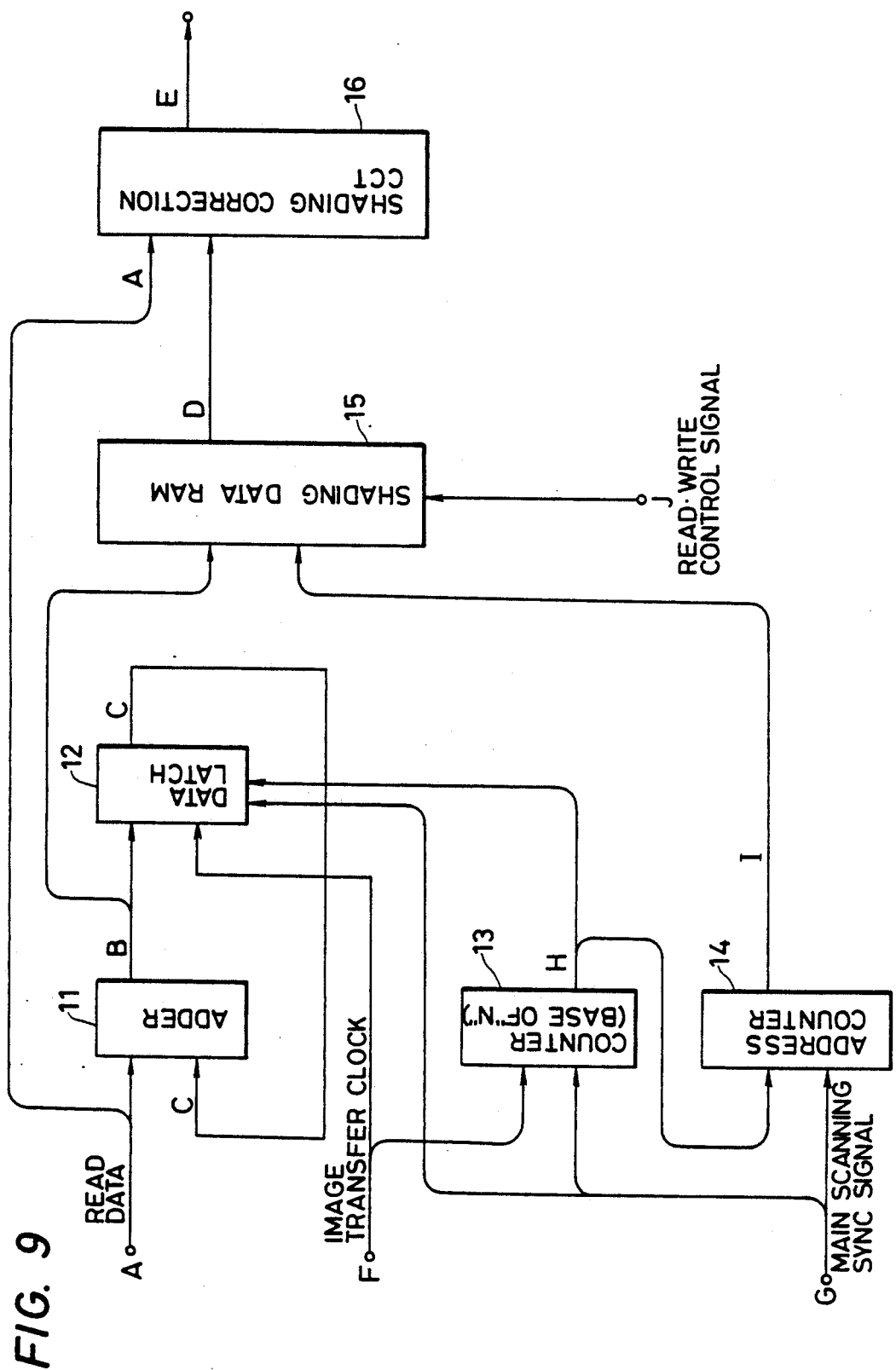
FIG. 9 is a block diagram showing another configuration of a shading correction device.

FIG. 9 shows an example of the basic arrangement for such a shading correction device.

The device has an adder 11, a sync data latch 12, a sync counter (base of N) 13, an address counter 14, a shading data RAM 15, and a shading correction circuit 16. Signals include read image data A by an image sensor system, an image transfer clock F, a main scanning sync signal G, and a read/write control signal J.

In the shading correction device of this configuration, the data C of the data latch 12 is cleared by the main scanning sync signal G, and the counts of the counters 13 and 14 are also cleared.

In order to obtain shading correction data, the RAM 15 is set in the write mode by the read/write control signal J at a predetermined timing as will be described later. The shading correction data is thus stored in the RAM 15. Image data A obtained by reading a white standard plate WP by an image sensor 1 is supplied to the adder 11 in synchronism with the image transfer clock F. The adder 11 receives the image data A and the output C from the data latch 12. Sum output B from the adder 11 is supplied to the latch 12 and the shading RAM 15.

The data latch 12 is cleared upon application of each main scanning sync signal G.

Figure 10:
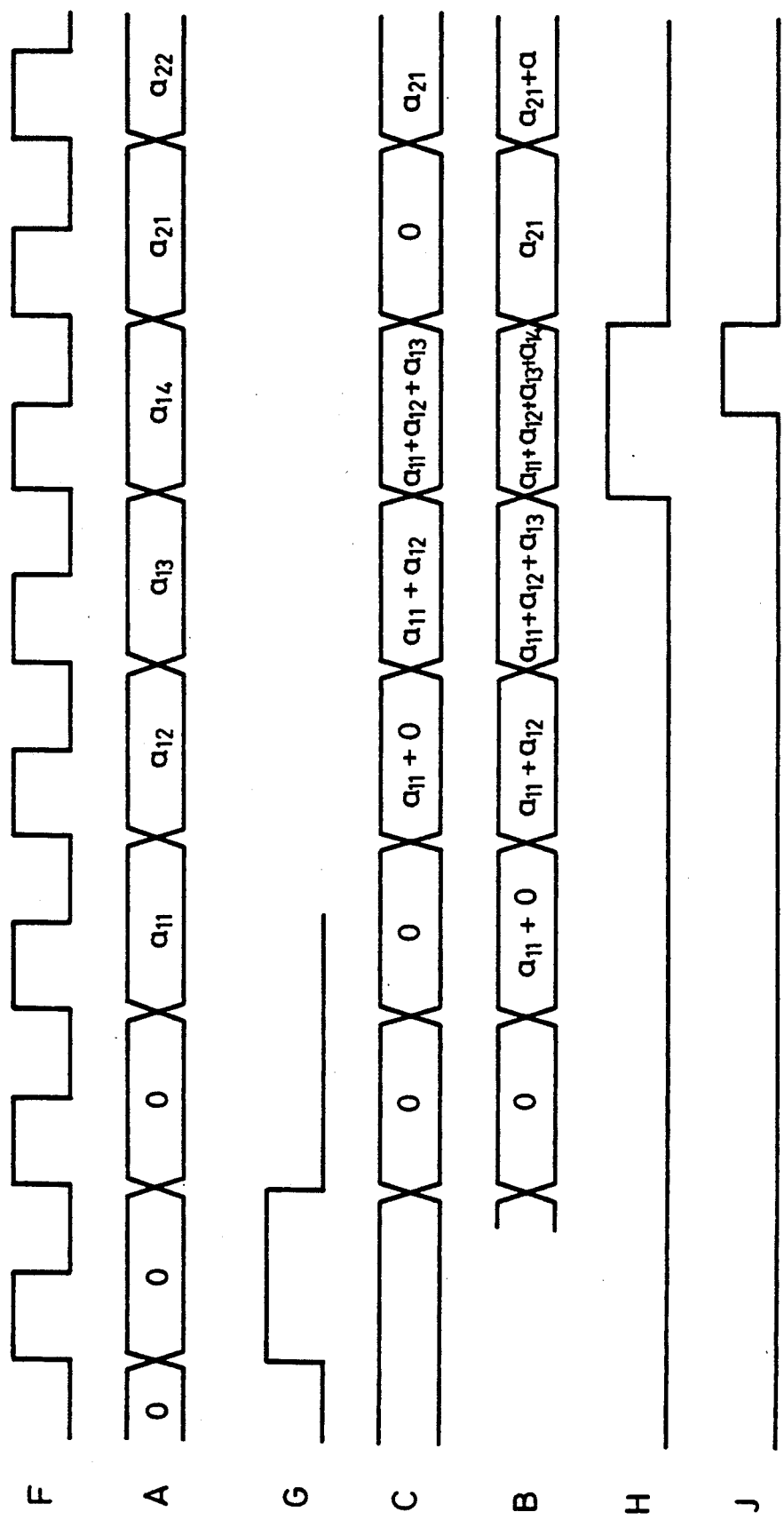
FIG. 10 is a timing chart showing the reading operation of shading correction data in the arrangement shown in FIG. 9.

This operation is performed in accordance with the timing chart shown in FIG. 10 which shows operation after application of the main scanning sync signal G.

In the following description, it is assumed that an average value for 4 pixels of the image data A obtained by reading the white standard plate WP is obtained by the adder 11 and the data latch 12, and the obtained average values are sequentially stored in the form of sum outputs B in the shading RAM 15 as the shading correction data.

The data latch 12 is controlled by the count output H obtained by setting the base of the counter 13 for counting the image transfer clocks F at 4.

More specifically, the pixel data a11 obtained by reading the white standard plate WP at the first time after application of the main scanning sync signal G is obtained as the sum output B from the adder 11. At this time, the output C from the latch 12 is 0. When the next image transfer clock F is generated, the pixel data a11 of the sum output B becomes the output C of the data latch 12, and is added to the next pixel data a12 by the adder 11. Thus, the sum output B becomes a11+a12.

In a similar manner, every time the subsequent image transfer clocks F are applied, the pixel data A are sequentially added to obtain a sum of the 4 pixel data: a11+a12+a13+a14.

When the RAM 15 is set in the write state by the read/write control signal J, the sum of 4 pixel data, a11+a12+a13+a14, is written in the shading data RAM 15. The counter 13 supplies the count up signal H to the data latch 12 to clear it and its output C becomes 0. The count up signal H from the counter 13 is also supplied to the address counter 14. As the count output I of the address counter 14 is incremented, the memory address of the shading data RAM 15 is updated in unitary increments.

Similarly, the sums of the image data A are sequentially written in the shading data RAM 15 in units of 4 pixels.

In the above description, the counter 13 has the base N=4, so that the counter 13 serves as the quaternary counter. However, the value of N can be suitably set so that the sum of a desired number of consecutive pixels along the main scanning direction can be stored in the RAM 15 and hence the average value of the desired number of pixels as the shading correction data for shading correction of original image read output.

An average value of data of a plurality of pixels can be easily calculated. That is, in order to calculate an average value of the sum of 4 pixel data of K bits, respectively, the 2 lowest bits of K bits representing the sum of 4 pixels are neglected, and the upper (K−2) bits are shifted to lower bits, thereby calculating the average value of the 4 pixel data. Alternatively, a RAM storing a table for converting pixel data into average data can be incorporated, and the ROM can be accessed using the pixel data sum as addresses to calculate the average value.

Figure 11:
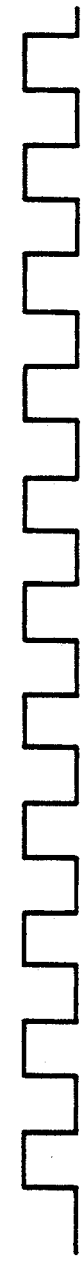
FIG. 11 is a timing chart showing another reading operation of shading correction data.

In this manner, the shading correction data obtained by reading the white standard plate is stored in the shading data RAM 15. Thereafter, the image data A obtained by reading a reading object such as an original to be subjected to shading correction by the image sensor 1 is subjected to shading correction in accordance with the timing chart shown in FIG. 11.

More specifically, pixel data b1, b2, b3 and so on of the image data A obtained by reading the original are supplied to the shading correction circuit 16. The shading correction data D read out from the shading data RAM 15 set in the read mode by the read/write control signal J is also supplied to the shading correction circuit 16.

When the shading correction data D is read out from the shading data RAM 15, the count up signal H from the counter 13, i.e., the count up signal H generated by the quaternary counter 13 for every 4-pixel period when N is 4, increments the address counter 14. The memory of the shading data RAM 15 is updated by the count output I of the address counter 14. The sum of the 4 pixel data obtained by reading the white standard plate WP, a11+a12+a13+a14, a21+a22+a23+a24, and so on, or their average values are sequentially supplied from the shading data RAM 15 to the shading correction circuit 16 at 4-pixel period as the shading correction data D.

The shading correction circuit 16 can comprise a multiplier. That is, the circuit 16 multiplies the image data A obtained by the original by the shading correction data in units of pixels, and reads out from a ROM prestoring such multiplication results using these data as addresses. The multiplication results are obtained as the image output data E which has been subjected to shading correction.

The details of the basic configuration of the shading correction device according to the present invention shown in FIG. 9 will be described below.

Figure 12:
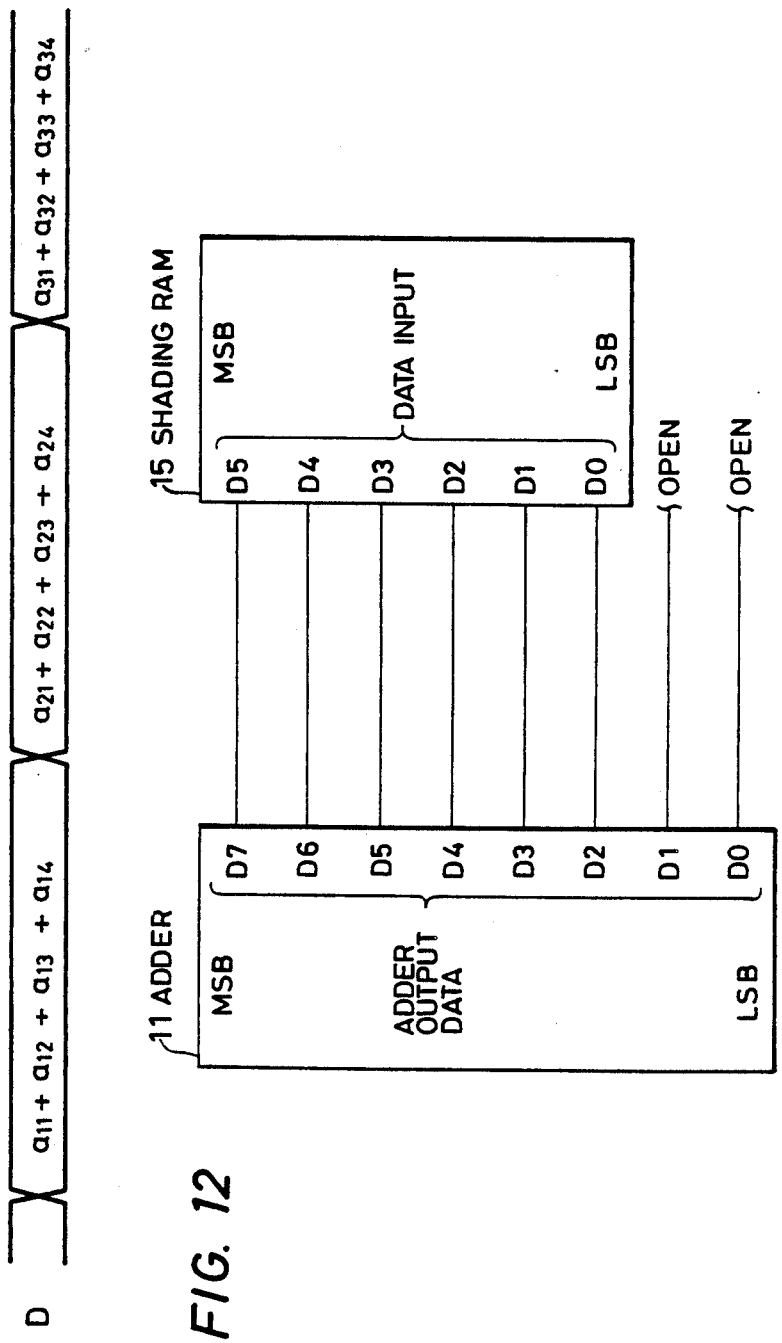
FIG. 12 is a block diagram showing a configuration of a circuit portion for converting pixel data sum output into an average output.

FIG. 12 shows an example of data processing for calculating an average value of the sum output B when the adder 11 supplies the sum output B of the pixel data to the shading data RAM 15.

Assume that the read data have a 6-bit configuration, and the 6-bit data is added for a plurality of pixels by the adder 11 so as to obtain sum output data of an 8-bit configuration. The 8-bit data is parallel supplied to the shading data RAM 15 from 7 output terminals D0 to D7 of the adder 11. In this case, the shading data RAM 15 has 6 input terminals D0 to D5. With this configuration, of the 8-bit data D0 to D7 of the sum output data of 4-pixel data, the 2 lowest bits D0 and D1 are omitted, and the upper 6-bit data D2 to D7 are parallel supplied to the input terminals D0 to D5 of the shading data RAM 15. In this manner, the binary number having an 8-bit configuration from the adder 11 is divided by 4, and the obtained average value of the sum output of 4-pixel data is supplied to the shading data RAM 15.

Figure 13:
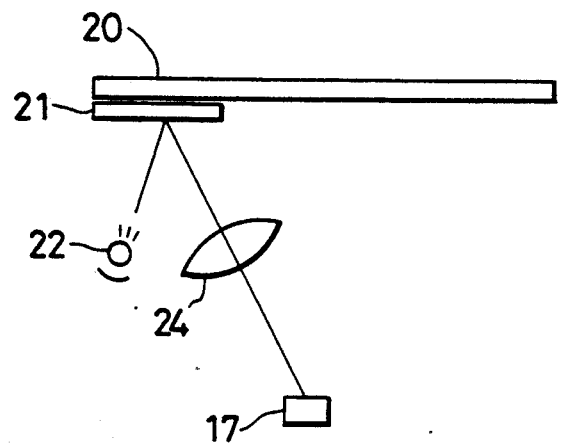
FIG. 13 is a schematic diagram showing the construction of an original reading section.

An example of the configuration of the original reader is shown in FIG. 13.

Referring to FIG. 13, the reflected light from a white standard plate 21 placed below an original table 20 and illuminated with light from a light source 22 is received by a solid-stage image sensor 17 comprising a CCD linear image sensor through a lens 24. Image data obtained from the sensor 17 is electrically processed by the circuit as described above. In the arrangement shown in FIG. 14A, the white standard plate 21 is closely attached to the original table 20. In contrast to this, in FIG. 14B, a space 25 is maintained between the original table 20 and the white standard plate 21. In the latter case, since the lens 24 is focused to the upper surface of the original table 20, i.e., the original surface, the lens 24 is out of focus with respect to the white standard plate 21. Therefore, since a plurality of pixel images are projected overlapped on the image sensor 17 comprising the CCD sensor, the output pixel data need not be processed to calculated an average value but the average pixel data can be directly obtained as sensor output. In this case, the configuration of the circuit can be simplified.

Figure 14:
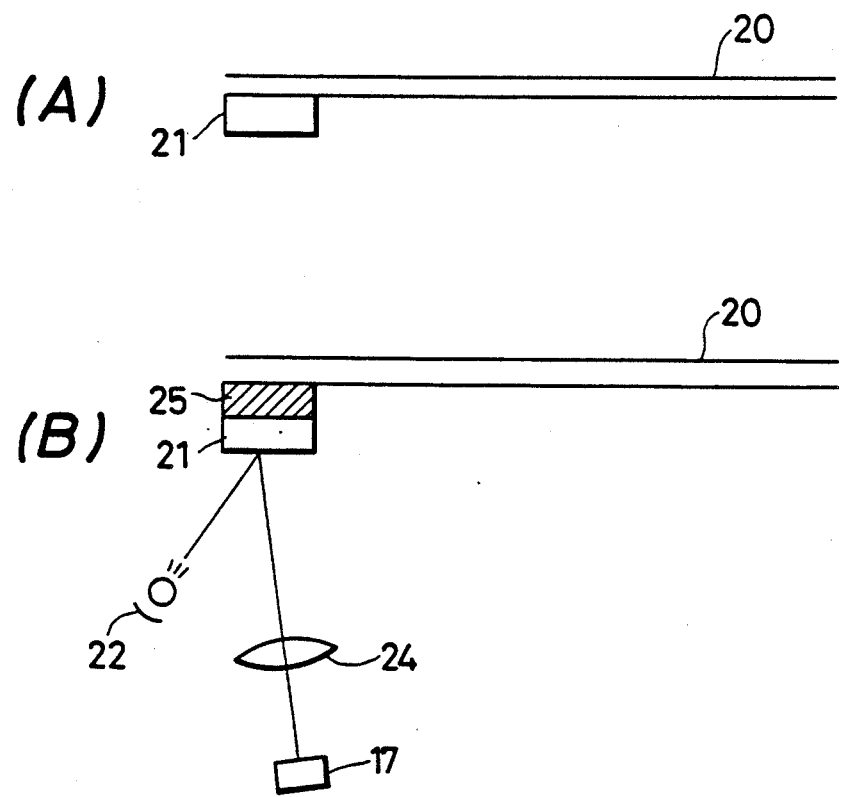
FIGS. 14A and 14B show the arrangements of an original reading section and the remaining section.
Figure 15:
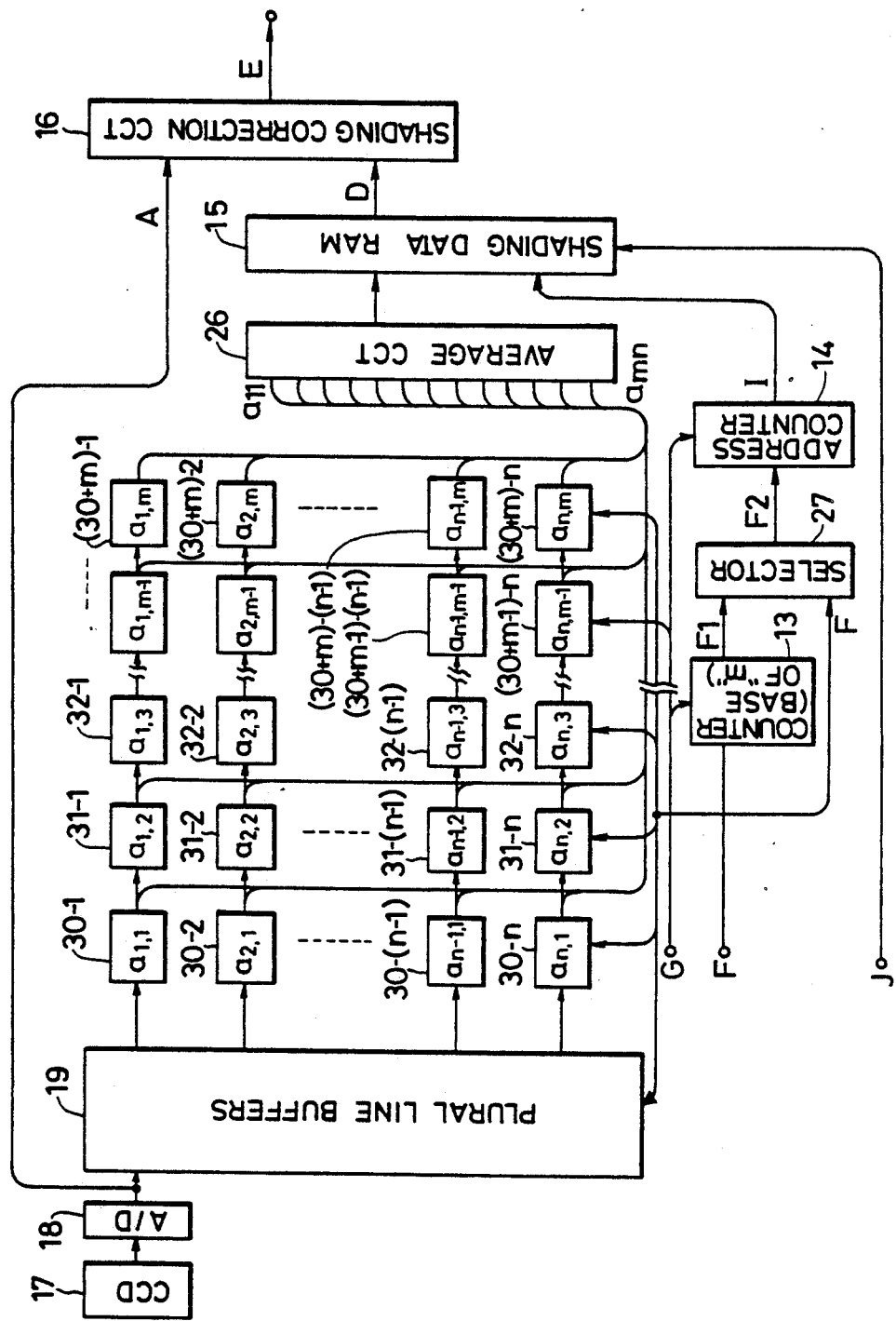
FIG. 15 is a block diagram showing another configuration of a shading correction device.

FIG. 15 shows the details of an example of the configuration of the device for performing shading correction when the original reader of the type as shown in FIG. 14A is used. The following description will be made with reference to the basic configuration shown in FIG. 9.

In the illustrated circuit configuration, the light source 22 and the lens 24 are moved in the subscanning direction, while the white standard plate 21 is read by the sensor 17 a plurality of times. Image data of a plurality of main scanning lines is stored in a plural line buffer 19 through an A/D converter 18.

A counter (base of m) 13 and an address counter 14 are cleared upon application of each main scanning sync signal G.

In this manner, image data of a plurality of lines are sequentially read into the buffer 19 in synchronism with image transfer clocks F. The pixel data a1, 1; a2, 1; a3, 1; ... ,; an, 1 for n main scanning lines are supplied in units of lines to shift registers 30-1, 30-2, 30-3, ..., 30-n arranged in units of pixels. The data are sequentially shifted in m series-connected pixel-unit shift registers 30-i, 31-i, 32-i, ..., (30+m)−i (where i=1, 2, ..., n) for each line in response to the image transfer clocks F.

The pixel data ai, 1; ai, 2; ai, 3; ..., ai, m of m pixels for each line of n lines are parallel supplied to an average circuit 26.

The average circuit 26 calculates an average value of the pixel data of n lines x m pixels, and writes it in a shading data RAM 15 set in the write mode by a read/write control signal J in accordance with an address accessed by a count output from the address counter 14.

When image data is obtained by reading an original image by the sensor 17, the shading correction data D read out from the shading data RAM 15 is supplied to a shading correction circuit 16. The circuit 16 performs shading correction as described with reference to FIG. 9.

The image transfer clocks F are m-frequency divided by the counter 13, and original clocks F or the m-frequency divided clocks F1 are selected by a selector 27. Selected output clocks F2 are supplied to the address counter 14 and are counted. When the original clocks F are selected as the selected output clocks F2, average values of pixel data of a plurality of pixels for each of a plurality of lines are obtained as shading correction data in correspondence with each pixel along the main scanning direction by the convolution method, and the shading correction data is different for each pixel along the main scanning direction. When the m-frequency divided clocks F1 are the selected output clocks F2, average values of pixel data of a plurality of pixels for each of a plurality of lines are obtained as shading correction data in correspondence with each m pixels along the main scanning direction. Thus, the shading correction data differs for each m pixels along the main scanning direction.

When m=1, the average value of the pixel data of a plurality of lines becomes the shading correction data. When n=1, the average value of a plurality of pixel data for each line becomes the shading correction data.

When the shading correction data is read out from the RAM 15, the read/write control signal J is set in the read mode.

The averaging range of correction data for image data to be subjected to shading correction can be determined by selecting which of the pixel data matrix ai, j corresponds to the image data A.

Figure 16:
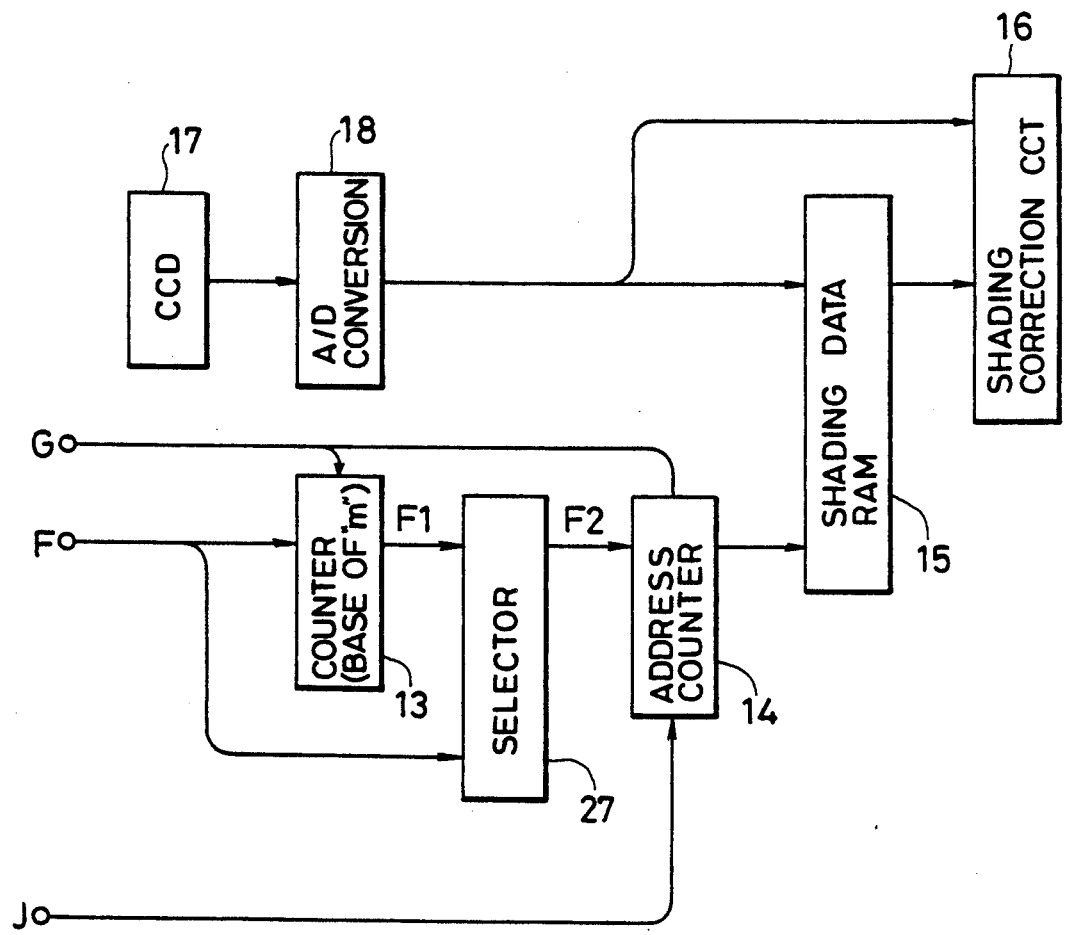
FIG. 16 is a block diagram showing still another configuration of a shading correction device.

As shown in FIG. 14B, assume that the focal point of the optical system for reading the white standard plate 21 is out of focus and the pixel data is averaged optically. FIG. 16 shows an example of the configuration of the shading correction device in this case.

In this case, the pixel data obtained by reading the white standard plate 20 by the sensor 17 has already been averaged; each pixel data is an average value of adjacent pixels. Therefore, the pixel data is directly supplied to the shading data RAM 15 through the A/D converter 18.

A control section consisting of the counter 13, the address counter 14, and the selector 27 for controlling read/write operation of the averaged pixel data in and out of the shading data RAM 15 is operated in the manner described with reference to FIG. 15 and shading correction of the original read data is performed. In this case, again, when the range of averaging the correction data for pixel data to be shading corrected, or the sampling period of the pixel data averaged in units of pixels, is properly set, the shading correction can be performed in the same manner as described with reference to FIG. 15 with a simple circuit configuration.

As can be seen from the above description, even if a white standard plate for obtaining shading correction data is scratched or contaminated, since shading correction data is obtained by averaging data for a plurality of pixels, a line or spot will not be formed in a reproduced image, thereby allowing excellent shading correction.

What is claimed is:

1. An image reading apparatus comprising:
    reading means for photoelectrically reading an image line by line;
    a standard member having a uniform density;
    converting means for converting output data from said reading means into logarithmic data;
    memory means for storing a line of logarithmic shading correction data obtained by logarithmic conversion of shading correction data by said converting means, said shading correction being obtained by reading said standard member using said reading means; and
    correcting means for correcting shading distortion of image data obtained by reading an original image using said reading means,
    wherein the logarithmic shading data stored in said memory means is read out in synchronism with reading of the original image by said reading means line by line, and
    wherein said correcting means performs an arithmetic operation on logarithmic image data obtained by logarithmic conversion of the image data by said converting means and the logarithmic shading correction data read out from said memory means.

2. An apparatus according to claim 1, wherein said correcting means performs an arithmetic operation including addition and subtraction on the logarithmic image data and the logarithmic correction data stored in said memory means.

3. An apparatus according to claim 1, wherein said standard member is white.

4. An apparatus according to claim 1, wherein said reading means includes a line sensor comprising a plurality of light-receiving elements which are arranged in a linear configuration.

5. An apparatus according to claim 1, wherein said reading means includes a light source for illuminating the image to be read.

6. An image reading apparatus according to claim 1, wherein said memory means has a capacity less than what would be required to store a line of shading correction data without logarithmic conversion.

7. An image reading apparatus according to claim 1, further comprising means for averaging shading correction data of several pixels of one scan line for storage in said memory means as part of a line of logarithmic shading correction data.

* * * * *

UNITED STATES PATENT AND TRADEMARK OFFICE
CERTIFICATE OF CORRECTION

PATENT NO. : 5,001,768

DATED : March 19, 1991

INVENTOR(S) : Yoshinobu MITA, ET AL.

It is certified that error appears in the above-identified patent and that said Letters Patent is hereby corrected as shown below: ON THE TITLE PAGE:

AT [30] Foreign Application Priority Data:

"Japan ..... 160332" should read
--Japan ..... 59-160332--;

"Japan ..... 160333" should read
--Japan ..... 59-160333--.

AT [56] References Cited:

U.S. PATENT DOCUMENTS

"4,472,736 9/1918 4Ushio" should read
--4,472,736 9/1984 Ushio--.

COLUMN 4:
Line 22, "FIG. 5." should read --FIG. 4.--

COLUMN 5:
Line 22, "shading corrected" should read
--shading-corrected--.

COLUMN 6:
Line 7, "a" should read --an--; and
Line 8, "signal A" should read --signal $\overline{A}$--.

COLUMN 7:
Line 7, "clocks E" should read --clocks F--; and
Line 10, "clocks E" should read --clocks F--.

UNITED STATES PATENT AND TRADEMARK OFFICE
CERTIFICATE OF CORRECTION

PATENT NO. : 5,001,768  Page 2 of 2
DATED : March 19, 1991
INVENTOR(S) : Yoshinobu MITA, ET AL.

It is certified that error appears in the above-identified patent and that said Letters Patent is hereby corrected as shown below:

COLUMN 8:

Line 32, "ROM" should read --RAM--.

COLUMN 9:
    Line 14, "7 output terminals D0 to D7" should read
        --8 output terminals D0 to D7--.
    Line 44, "calculated" should read --calculate--.

Signed and Sealed this

Ninth Day of February, 1993

*Attest:*

STEPHEN G. KUNIN

*Attesting Officer*    *Acting Commissioner of Patents and Trademarks*